(12) United States Patent
Mikesch (10) Patent No.: US 12,259,166 B2
(45) Date of Patent: Mar. 25, 2025

(54) DEVICE FOR MEASURING A LIQUID LEVEL OF A MEDIUM AT A HIGH TEMPERATURE, CONTAINER, REFRIGERATING MACHINE OR REFRIGERATION CYCLE HAVING SUCH A DEVICE

(71) Applicant: Armaturenwerk Altenburg GmbH, Altenburg (DE)

(72) Inventor: Lucas Mikesch, Schmolln (DE)

(73) Assignee: Armaturenwerk Altenburg GmbH, Altenburg (DE)

( * ) Notice: Subject to any disclaimer, the term of this patent is extended or adjusted under 35 U.S.C. 154(b) by 286 days.

(21) Appl. No.: 17/946,324

(22) Filed: Sep. 16, 2022

(65) Prior Publication Data
US 2023/0093463 A1 Mar. 23, 2023

(30) Foreign Application Priority Data

Sep. 21, 2021 (DE) .......................... 102021124439.0

(51) Int. Cl.
*F25B 49/02* (2006.01)
*G01F 23/30* (2006.01)
(52) U.S. Cl.
CPC .............. *F25B 49/02* (2013.01); *G01F 23/30* (2013.01); *F25B 2700/04* (2013.01)
(58) Field of Classification Search
CPC ....... F25B 49/02; F25B 2700/04; G01F 23/30
(Continued)

(56) References Cited

U.S. PATENT DOCUMENTS 2,615,338 A * 10/1952 Kilsby .................. G01F 23/162
73/330
4,696,261 A 9/1987 Hayashi
6,125,642 A * 10/2000 Seener .................. F16N 19/006
62/193

FOREIGN PATENT DOCUMENTS

CN 209894284 U 1/2020
DE 30723 B1 1/1966
(Continued)

OTHER PUBLICATIONS

Office Action issued May 17, 2022, in corresponding German application No. 10 2021 124 439.0.
(Continued)

*Primary Examiner* — Nathaniel T Woodward
(74) *Attorney, Agent, or Firm* — Nath, Goldberg & Meyer; Jerald L. Meyer; Stanley N. Protigal (57) ABSTRACT

The present invention relates to a device (1) for measuring a liquid level of a medium at a high temperature in a container (5), having a measuring unit (10) with a measurement chamber (15) and a measuring instrument (20) for determining the liquid level in said measurement chamber, and having a connecting feature (30) for connecting said measuring unit (10) with said container (5) at a distance and for transferring the medium from said container (5) into said measurement chamber (15), wherein said connecting feature (30) has an attachment adapter (35) for fastening to said container (5) and a connection adapter (45) for connecting to said measuring unit (10), wherein said attachment adapter (35) and said connection adapter (45) are arranged at a distance by at least two connecting lines (40) along an axis (X). Furthermore, the present invention relates to a refrigerating machine having such a device.

17 Claims, 4 Drawing Sheets

(58) Field of Classification Search
USPC .......................................................... 73/305
See application file for complete search history.

(56) References Cited

FOREIGN PATENT DOCUMENTS

| EP | 3885715 A1 | 9/2021 |
|----|------------|--------|
| JP | 10281850 A | 10/1998 |
| WO | 2017/098346 A1 | 6/2017 |

OTHER PUBLICATIONS

Search report issued Feb. 22, 2023, in parallel European application No. 22188030.5.

\* cited by examiner

DEVICE FOR MEASURING A LIQUID LEVEL OF A MEDIUM AT A HIGH TEMPERATURE, CONTAINER, REFRIGERATING MACHINE OR REFRIGERATION CYCLE HAVING SUCH A DEVICE

FIELD

The present invention relates to a device for measuring a liquid level of a hot medium, in particular oil, in a container having a measuring unit with a measurement chamber and a measuring instrument for determining the liquid level in the measurement chamber, and a refrigerating machine or refrigeration cycle having such a device.

BACKGROUND

Devices for measuring a liquid level of a medium are already known from the prior art in different configurations. Such devices comprise a measuring instrument, with different measuring techniques being available for electronic detection of the liquid level. For example, float-based, optical or acoustic measurement techniques are widespread. The devices for measuring a liquid level of a medium are used in machines or systems which have a continuous need for a medium, in particular lubricant or oil, for safe and efficient operation. Reliable monitoring of the liquid level is therefore absolutely necessary.

Refrigerating machines, in particular screw compressors, are often arranged downstream of oil separators in order to avoid oil hammer in the connected refrigeration cycles. The oil separated there is under high pressure and at a high temperature and is returned to the refrigerating machine.

Such devices for measuring a liquid level have proven useful in the past, but the high pressures and high temperatures pose a particular challenge. For example, in refrigerating machines, the permissible temperatures for the measuring instruments used are often exceeded at the measuring point and there is no reliable determination of the liquid level.

SUMMARY

This is where the present invention comes in.

It is the object of the present invention to propose a device for measuring a liquid level of a hot medium in a container, which eliminates the disadvantages known from the prior art in an expedient manner. The device should enable reliable level measurement even at high temperatures of the medium and at high pressures and, moreover, should not be susceptible to wave movements of the medium in the container.

These objects are achieved by a device for measuring a liquid level of a hot medium in a container having a measuring unit with a measurement chamber and a measuring instrument for determining the liquid level in the measurement chamber and by a container for a medium at a high temperature with such a device, and a refrigerating machine or refrigeration cycle having such a device.

Further advantageous configurations of the present invention are specified in the dependent claims.

The device according to the invention for measuring a liquid level of a medium, in particular a lubricating medium, preferably oil, at a high temperature in a container, in particular an oil sump of a refrigerating machine, has a measuring unit with a measurement chamber and a liquid level measuring instrument for determining the liquid level in the measurement chamber and a connecting feature for connecting the measuring unit to the container at a distance and for exchanging fluid between the container and the measurement chamber. In addition, the connecting feature has an attachment adapter with means for fastening to the container and a connection adapter with means for connecting to the measuring unit, the attachment adapter and the connection adapter being arranged at a distance by at least two connecting lines along an axis.

The present invention is based on the idea of arranging the measuring unit via a connecting feature at a distance from the container with the hot medium. At least one of the at least two connecting lines is configured to raise or lower the liquid level in the measurement chamber and at least one other of the at least two connecting lines is configured to aerate and vent the measurement chamber. A cooling or lowering of the temperature of the medium takes place over a length of the connecting lines, it being possible for the length of the connecting lines to be dimensioned for cooling the medium depending on the application.

A preferred development of the present invention provides that the at least two connecting lines can be cooled by convection. The at least two connecting lines can be bundled and/or separated for this purpose. The at least two connecting lines are preferably aligned horizontally and/or freestanding, as a result of which particularly good cooling by convection can be achieved, particularly in the case of a circular cross section. The respective connecting line can either be separated or the at least two connecting lines can be bundled. It is also conceivable within the scope of this invention for the connecting lines to have an increase in surface area, for example by cooling ribs, cooling fins or the like.

In addition, it has proven to be advantageous if at least four, preferably five, even more preferably six or more connecting lines are provided, and if, more preferably, the connecting lines are arranged parallel and/or symmetrically to the axis. In particular, it is advantageous to provide more than two connecting lines. The attachment adapter does not have to be precisely aligned for fastening to the container, but can remain in any position after fastening, in particular by screwing it in or screwing it on. The plurality of connecting lines can ensure that the liquid level in the measurement chamber can always be raised or lowered via at least one of the connecting lines and at least one other of the connecting lines can aerate or vent the measurement chamber sufficiently.

As provided by a preferred development of the present invention, a collection chamber is arranged between the at least two connecting lines and the measurement chamber, and which connects the at least two connecting lines with one another. The collection chamber is fluidly interposed between the measurement chamber and the at least two connecting lines and is in communication with the measurement chamber. The liquid level in the measurement chamber is raised or lowered via the collection chamber and the measurement chamber is aerated or vented. The collection chamber acts as a damper between the container or the at least two connecting lines and the measurement chamber and prevents wave movements of the medium in the container from being transmitted to the measurement chamber in the measuring unit.

A preferred development of the present invention provides that the collection chamber is formed by a collection channel extending around the longitudinal axis. The collection chamber or the collection channel forming the collection chamber can be oval, ring-shaped or polygonal and can also extend completely or only partially about the longitudinal axis. The collection chamber preferably connects all of the at least two connecting lines to one another.

Furthermore, as provided by the present invention, it can be advantageous if the collection chamber is formed or enclosed by the connection adapter and/or the measuring unit. Preferably, the connection adapter on the side facing the measuring unit and/or the measuring unit on the side facing the connection adapter can have a recess forming the collection chamber, into which the at least two connecting lines open or can open. The collection chamber can be closed by the corresponding configuration of the connection adapter and the measuring unit and can also be closed from the environment by means of one or more seals. In this way, the collection chamber can be produced simply and inexpensively.

A development of the present invention provides that the measurement chamber is connected to the collection chamber via an inlet and an outlet. The inlet and/or the outlet of the measurement chamber also have/has a flow-through cross section. The flow-through cross section can be smaller than a cross section of at least one of the at least two connecting lines. Preferably, the flow-through cross section of the inlet and/or the outlet can be smaller than the sum of the cross sections of the at least two connecting lines. The damping of the collection chamber is increased due to the smaller flow-through cross section. It should be noted that the flow-through cross section of the inlet and/or outlet should not be chosen too small in order to avoid excessive inertia of the measuring device.

Furthermore, it can be advantageous if a ratio of the length and the inside diameter—preferably of each—of the at least two connecting lines is chosen to be large. In particular, it is preferred if the "length-to-internal diameter ratio" is greater than 5, more preferably greater than 10, even more preferably greater than 20 or more. Large "length-to-internal diameter ratios" lead to damping of wave movements in the medium.

In addition, it has proven to be advantageous if the measuring unit can be rotated about the axis relative to the connection adapter. A rotary joint is preferably formed between the measuring unit and the connection adapter, which makes it possible to rotate the measuring unit—regardless of the alignment of the connecting feature at the container—about the axis for vertical alignment. The rotary joint can be formed from cooperating planar surfaces at the connection adapter and at the measuring unit. In particular, it can be advantageous if, in addition, fixing means are provided by which the measuring unit can be fixed relative to the connection adapter in order to prevent the measuring unit from rotating undesirably. The fixing means are preferably at the same time the mounting means by which the measuring unit can be fastened to the connecting device.

As provided by a further advantageous embodiment, the device for measuring can have an oil lance. The oil lance enables oil to be fed into the container, preferably by being fed through the device. The device can be a level management system and both monitor the liquid level and cause the medium to be refilled in the container. For this purpose, the device can have a corresponding controller and/or actuators, for example a valve. The oil lance is preferably oriented parallel to the axis between the at least two connecting lines. In particular, it is preferred if the oil lance is arranged coaxially to the axis and more preferably protrudes through the connection adapter in the axis and even more preferably projects beyond the free end of the connection adapter.

As provided by a development of the present invention, the liquid level measuring instrument is float-based. Alternatively or additionally, the liquid level measuring instrument can have an optical, acoustic, magnetic sensor system, for example by means of a Hall sensor, for determining the liquid level in the measurement chamber.

Furthermore, it can be advantageous if the measurement chamber has a viewing window or a sight glass through which the liquid level in the measurement chamber can be visually perceived.

A further aspect of the present invention relates to a container having a device for measuring a liquid level as described above. The container is preferably a pressure-resistant container that is suitable for receiving the medium at a high temperature.

A further aspect of the present invention relates to a refrigeration cycle or a refrigerating machine, in particular a refrigerant compressor, or an oil separator of a refrigeration cycle with a previously described device for measuring a liquid level of a medium in a container. The container is preferably formed by an oil sump of the refrigerating machine.

BRIEF DESCRIPTION OF THE DRAWINGS

An exemplary embodiment of a device according to the invention for measuring a liquid level of a medium will be described in detail below with reference to the accompanying drawings, in which.

DETAILED DESCRIPTION

Identical or functionally identical components are marked with the same reference symbols. In addition, not all identical or functionally identical components are provided with a reference numeral in the figures.

Figure 1:
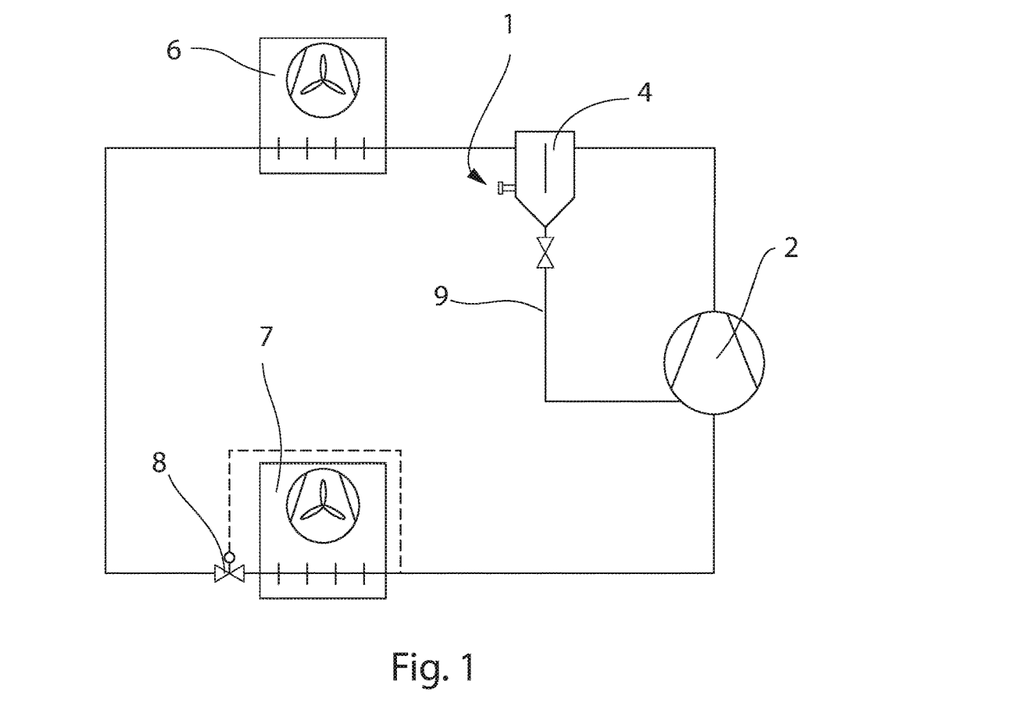
FIG. 1 shows a schematic and greatly simplified refrigeration cycle with two heat exchangers, a refrigerating machine, an oil separator with a device for measuring a liquid level and an expansion element.

FIG. 1 shows a refrigeration cycle 3 of a refrigerant, having a refrigerant compressor designed as a refrigerating machine 2, an oil separator 4 having a device 1 for measuring a liquid level of a medium at a high temperature, two heat exchangers 6, 7, and an expansion element 8. A refrigerant coming from the refrigerating machine 2, in particular refrigerant compressor, is first routed to the oil separator 4, the oil separator 4 separating the medium, in particular oil, from the refrigerant in order to avoid oil carry-over.

As indicated in FIG. 1, the medium can be supplied to the refrigerating machine 2 via a line 9. The oil separator 4 discharges the refrigerant with reduced oil carry-over, preferably via a refrigerant outlet, and the refrigerant is routed from there to a first heat exchanger 6 and cooled and/or liquefied by heat dissipation. The refrigerant is then routed via an expansion element 8 to the second heat exchanger 7, with the heat being able to be absorbed by the refrigerant in the second heat exchanger 7. The refrigerant of the refrigeration cycle 3 is preferably $CO_2$.

Figure 2:
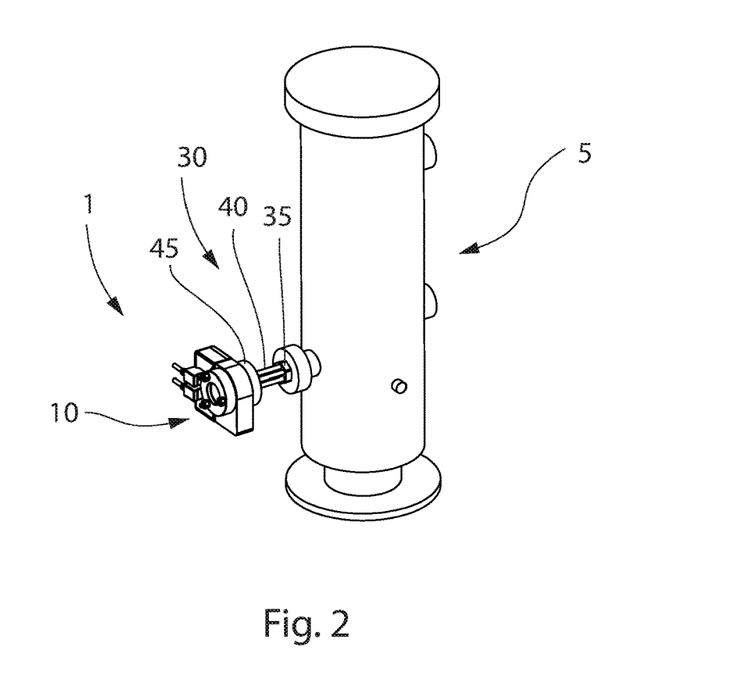
FIG. 2 shows an enlarged representation of the oil separator with the device for measuring a liquid level.
Figure 3:
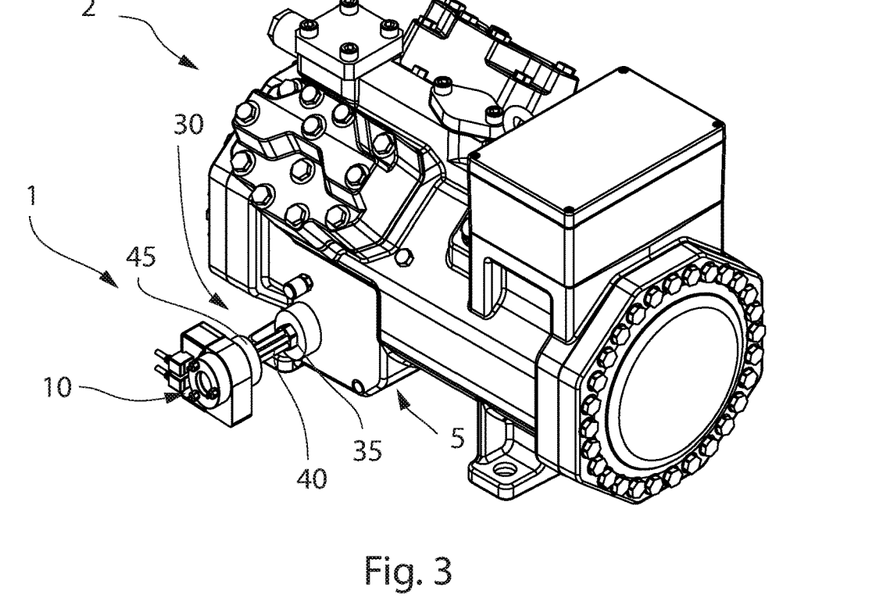
FIG. 3 shows an enlarged representation of the compressor according to FIG. 1 with the device for measuring a liquid level.

FIGS. 2 and 3 show an exemplary application of the device 1 for measuring a liquid level of a medium at a high temperature in a container 5. In the example according to FIG. 2—analogously to FIG. 1—the container 5 is formed by the oil separator 4. In FIG. 3 the container 5 is formed by the refrigerating machine 2, wherein the container 5 can be an oil sump of the refrigerating machine 2, for example.

FIGS. 4-7 show in detail the device 1 for measuring a liquid level of a medium at a high temperature according to FIGS. 2 and 3, where it can be seen that the device 1 comprises a measuring unit 10 and a connecting feature 30.

Figure 5:
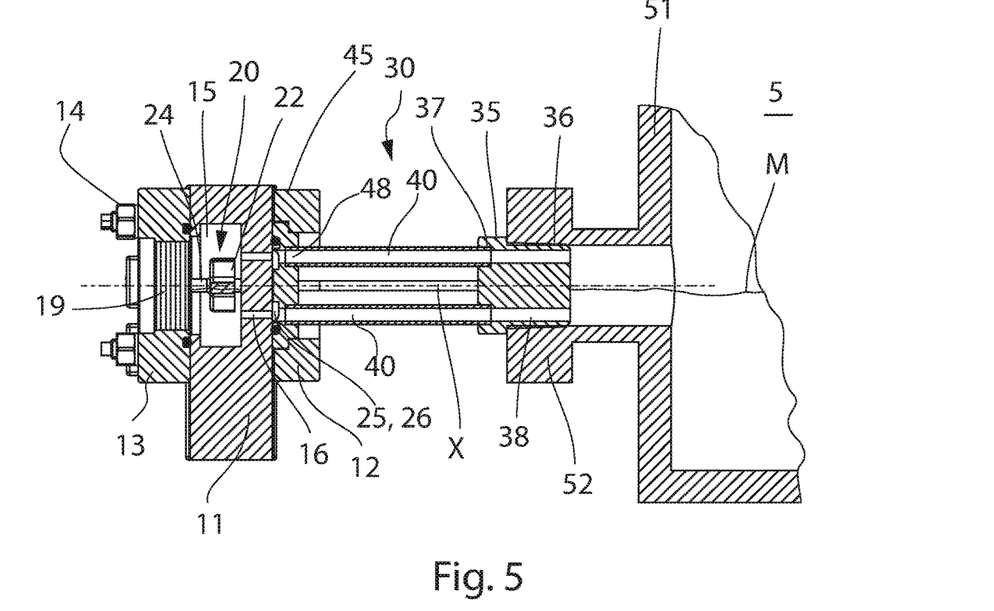
FIG. 5 shows a sectional representation of the device for measuring a liquid level according to FIGS. 1 to 3 mounted on the compressor or the oil separator.
Figure 6:
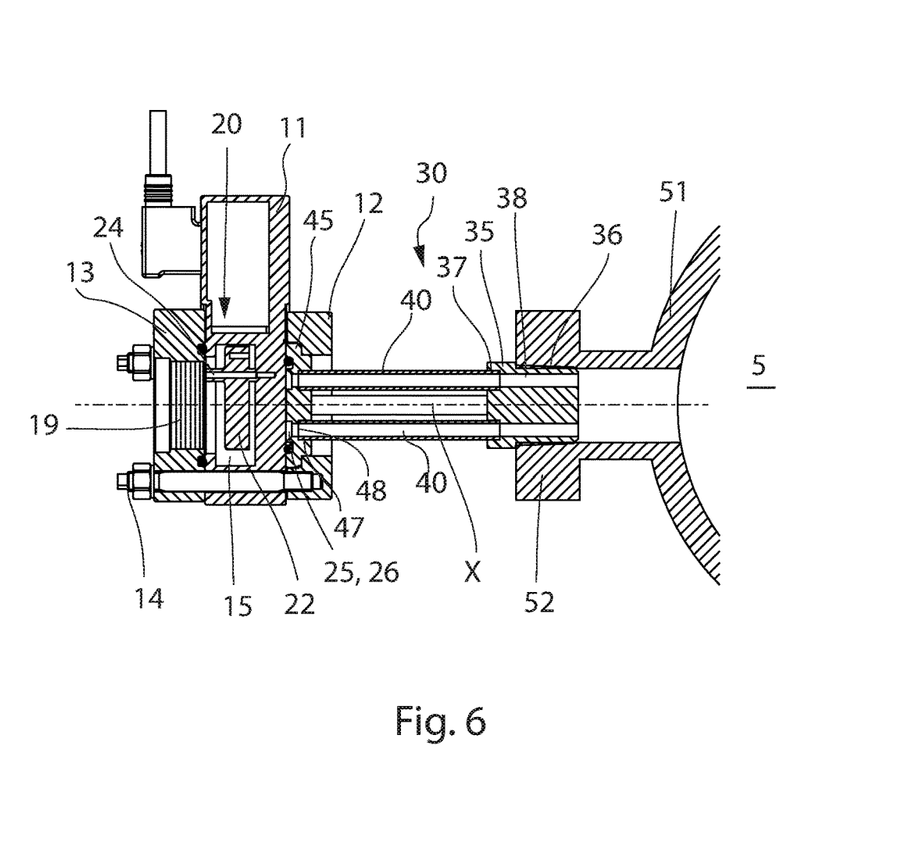
FIG. 6 shows a sectional representation of the device for measuring a liquid level according to FIGS. 1 to 3 mounted on the compressor or the oil separator.
Figure 7:
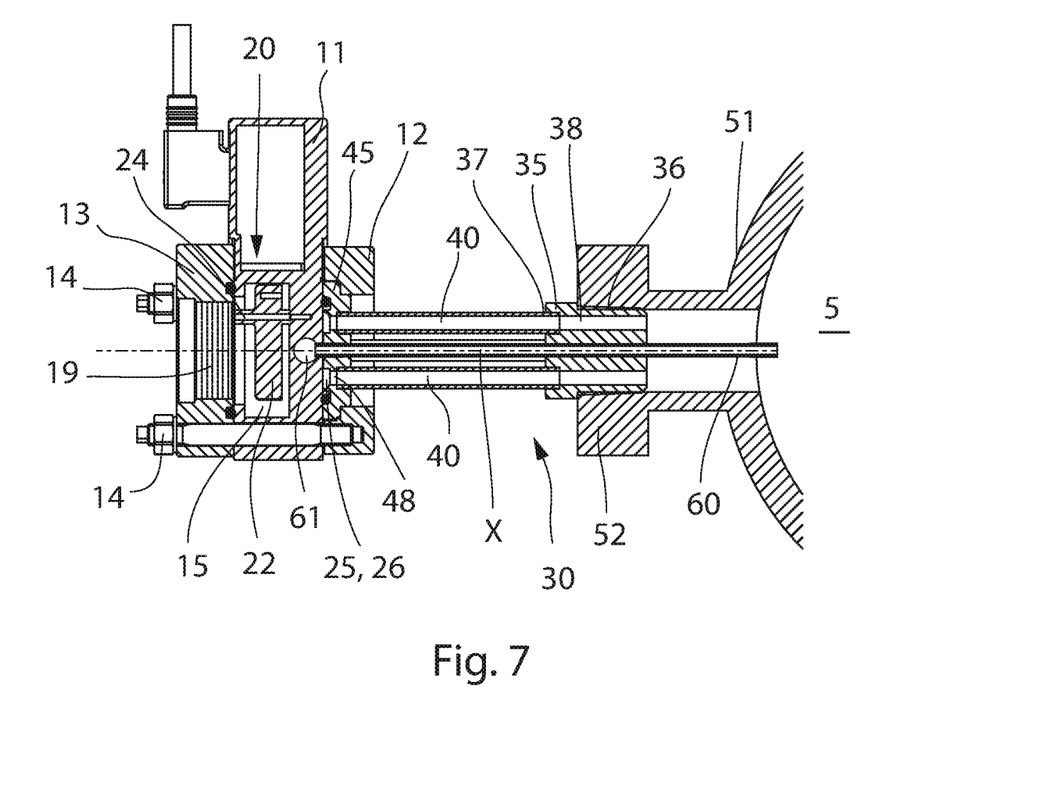
FIG. 7 shows a development of the device for measuring a liquid level having an oil lance.

As can be seen in FIGS. 5 to 7, the measuring unit 10 comprises a measurement chamber 15 and a measuring instrument 20 which is configured to determine the liquid level in the measurement chamber 15. The measuring instrument 20 can determine the liquid level in the measurement chamber 15 using one or more measuring principles. Possible measurement principles are, for example and not exclusively, acoustic, for example by means of ultrasound, optical, in particular by measuring the transit time of a light beam, or other measurement techniques, for example by means of a floater. At this point it should be noted that the measuring instrument 20 will be described below as a float-based measuring instrument 20, but the exemplary embodiments are not limited to the float-based measuring instrument 20.

The measuring instrument 20 can have a floater 22 which is arranged in the measurement chamber 15 so as to be rotatable about a float axis 24. The floater 22 may comprise a magnet (not shown) with an electronic sensor (not shown) being capable of sensing the magnetic field of the magnet. The liquid level of the medium in the measurement chamber 15 specifies the position of the floater 22 in the float axis 24, with the electronic sensor detecting the position of the floater 22 in the float axis 24 using the magnetic field and enabling the liquid level to be determined.

The measuring unit 10 can comprise a housing, referred to as a whole, made up of several housing parts 11, 12, 13, wherein the housing parts 11, 12, 13 can on the one hand enclose the measurement chamber 15, and on the other hand can be used to fasten the measuring unit 10 to the connecting device 30.

Figure 4:
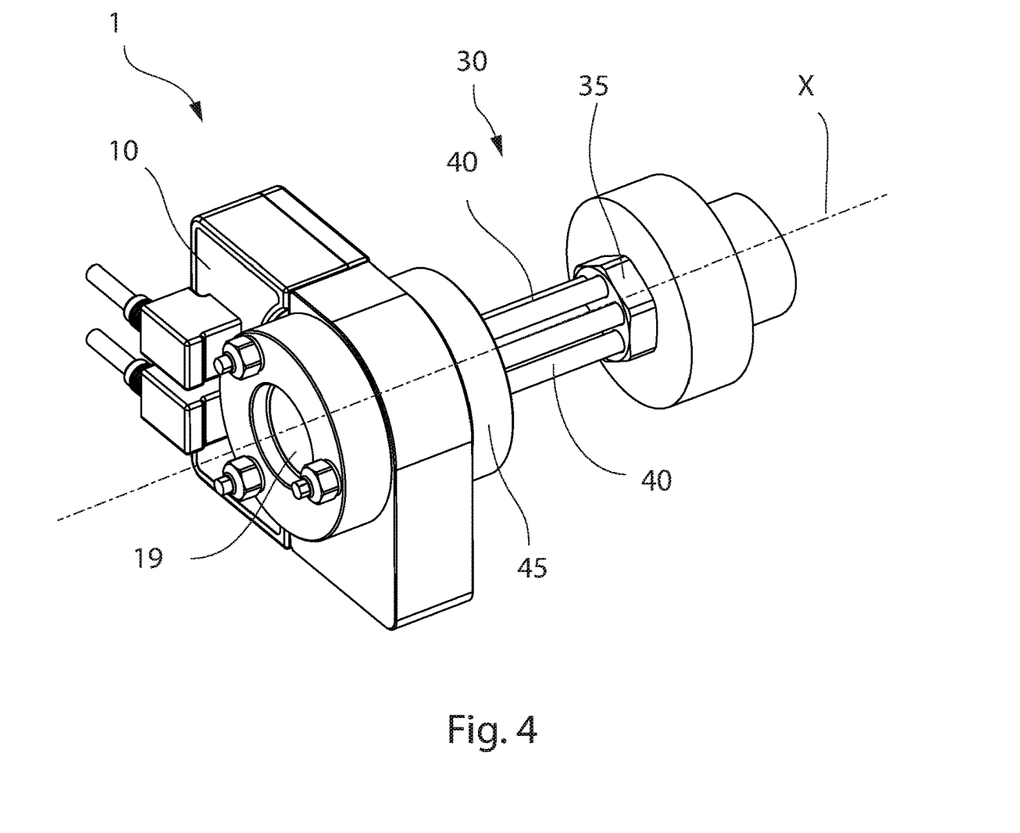
FIG. 4 shows a perspective representation of the device for measuring a liquid level according to FIGS. 1 to 3.

According to FIG. 4, the connecting feature 30 comprises an attachment adapter 35, at least two connecting lines 40 and a connection adapter 45. The connecting feature 30 serves to arrange the measuring unit 10 at a distance from the container 5 in an axis X and transfers the medium from the container 5 into the measurement chamber 15 and depending on a fill level M of the medium—see FIG. 5—in the container 5, the liquid level in the measurement chamber 15 is raised or lowered.

According to the exemplary embodiments illustrated in FIGS. 2 to 7, the connecting feature 30 has six connecting lines 40, which can be arranged parallel to the axis X and symmetrically about the axis X. At this point it should be noted that the number of connecting lines 40 can be selected as desired, but at least two connecting lines 40 must be provided, which can be arranged in such a way that one of the at least two connecting lines 40 can raise or lower the liquid level in the measurement chamber 15, and the second of the at least two connecting lines 40 is arranged in such a way that the measurement chamber 15 can be aerated or vented. If there are more than two connecting lines 40, more than one of the more than two connecting lines 40 can be utilized for raising and/or lowering the liquid level in the measurement chamber 15. Depending on the fill level in the measurement chamber 15, however, this number can vary.

The connecting feature 30 is arranged along axis X, with the attachment adapter 35 and the connection adapter 45 being arranged on opposite sides of the axis X. The axis X is preferably aligned horizontally. In other words, the axis X is preferably oriented perpendicular to the force vector of gravity.

The attachment adapter 35 is arranged on the side of the connecting feature 30 facing the container 5 and is set up to connect the device 1 to the container 5. The attachment adapter 35 can preferably be designed as a cylindrical plug and have a connecting means 36 that can bring about a pressure-tight connection to the container 5. In the exemplary embodiment shown, the connecting means 36 is formed by a thread which can be screwed into a corresponding attachment piece 52 on the container 5 or connected therewith by screws.

Furthermore, the attachment adapter 35 has a plurality of passage openings 38, which can have receptacles 37 on the side facing away from the container 5, in each of which a connecting line 40 is inserted and connected in a pressure-tight manner.

The connecting lines 40 are preferably thin-walled tubes made of a thermally conductive, preferably metallic, material and have a length L not shown in the figures and an inner diameter d not shown in the figures, the ratio L/d being ≥10, preferably ≥20, so that wave movements from the container in the direction of the measurement chamber 15 are dampened. The respective connecting line 40 is preferably free-standing and even more preferably aligned horizontally in order to be particularly easy to be cooled by convection. The length L of the connecting lines 40 can be dimensioned depending on the cooling requirement.

The connection adapter 45 has a passage opening 48 for each connecting line 40. On the side facing the attachment adapter 35, receptacles 47 can be formed in the respective through-holes 48, in which a connecting line 40 is arranged or connected in a pressure-tight manner.

According to developments that are not shown, the connecting feature 30 can be designed in one piece or in several pieces. For example, the attachment adapter 35, the connecting lines 40 and/or the connection adapter 45 can be designed as an integral component, for example produced by 3D printing.

The measuring unit 10 can be rotated about the axis X with respect to the connecting feature 30, which ensures that the measurement chamber 15 can be arranged in a vertical orientation independently of the installation situation of the attachment adapter 35 at the container 5. The inlet 16, the outlet 17 and the axis x can lie in a common plane preferably with the gravity vector. The rotatability of the measuring unit 10 relative to the connecting feature 30 about the axis X can be implemented by a rotary joint, which can be formed from interacting planar surfaces of the measuring unit 10 and the connection adapter 45.

Furthermore, it can be seen from FIGS. 5 and 6 that a collection chamber 25 is arranged between the connecting lines 40 and the measurement chamber 15, which collection chamber 25 connects the at least two connecting lines 40 with one another. The collection chamber 25 is fluidically connected between the connecting lines 40 and the measurement chamber 15.

The collection chamber 25 can be designed as a collection channel 26 arranged about the axis X, which can preferably be arranged completely and even more preferably annularly about the axis X and coaxially thereto. The collection chamber 25 is connected to the measurement chamber 15 via an inlet 16 and an outlet 17, the inlet 16 and the outlet 17 opening into the collection chamber 25 on diametrical sides of the axis X. The collection channel 26 can preferably be arranged about the axis X at a distance.

The collection chamber 25 can be formed in the manner of a puncture on one of the corresponding planar surfaces of the measuring unit 10 and/or the connection adapter 45, and is preferably enclosed by the measuring unit 10 or the housing part 11 of the measuring unit 10 and by the connection adapter 45. Furthermore, as can be seen in FIGS. 5-7, seals can be provided in the area of the planar surfaces in order to make the connection between the connecting feature 30 and the measuring unit 10 pressure-tight.

The connection adapter 45 can be held tensioned by the flange-shaped housing part 12 against the housing part 11 by means of connection means, as a result of which the measuring unit 10 can be fastened to the connecting feature 30. The rotary joint formed between the connecting feature 30 and the measuring unit 10 can also be fixed by the fastening.

Furthermore, optical accessibility of the measurement chamber 15 can be provided by a viewing window 19 or sight glass, whereby the liquid level of the medium in the measurement chamber 15 can be seen by the user for control purposes.

FIG. 7 shows a development of the device 1 according to FIGS. 1-6, in which case, in addition to the previously described exemplary embodiments, the device 1 has a lance 60 through which medium can be refilled through the device 1 into the container 5. The device 1 can thus be a fill level management system and on the one hand monitor a liquid level in the container 5 and on the other hand cause the medium to be refilled in the container 5 if the liquid level falls below a predetermined level. For this purpose, the device 1 can have corresponding actuators, by means of which the medium can be introduced into the container 5 through the lance 60 in a controlled manner.

As can be seen from the detailed representation according to FIG. 7, the lance 60 protrudes along the axis X from the attachment adapter 35 in a free-standing manner into the container 5. This means that any impact on the measuring accuracy of the measuring instrument 20 in the measurement chamber 15 can be excluded when medium is added through the device 1.

LIST OF REFERENCE NUMERALS 1 device
2 refrigerant compressor
3 refrigeration cycle
4 oil separator
5 container
6 heat exchanger
7 expansion element
8 line
10 measuring unit
11 housing part
12 housing part
13 housing part
14 fastener
15 measurement chamber
16 inlet
17 outlet
19 sight glass
20 measuring instrument
22 floater
25 collection chamber
26 collection channel
30 connecting feature
35 attachment adapter
36 fastener
37 recess
38 passage opening
40 connecting lines
45 connection adapter
48 passage opening
51 wall
52 attachment piece
60 lance
X axis

The invention claimed is:

1. A device (1) for measuring a liquid level of a medium at a high temperature in a container (5), having
a measuring unit (10) with a measurement chamber (15) and a measuring instrument (20) for determining the liquid level in the measurement chamber (15), and
a connecting feature (30) for connecting said measuring unit (10) to said container (5) at a distance and for transferring the medium from said container (5) into said measurement chamber (15),
wherein said connecting feature (30) has an attachment adapter (35) for fastening to said container (5) and a common connection adapter (45) for connecting to said measuring unit (10) via a plurality of connecting lines (40) with the common connection adapter (45),
and wherein said attachment adapter (35) and said connection adapter (45) are arranged at a distance along an axis (X) by at least two of said connecting lines (40).

2. The device (1) according to claim 1, characterized in that
the at least two connecting lines (40) extending between the connection adapter (45) and said measuring unit (10) so as to cool said at least two connecting lines (40) by convection.

3. The device (1) according to claim 1, characterized in that at least four connecting lines (40) are provided.

4. The device (1) according to claim 1, characterized in that said at least two connecting lines (40) are arranged parallel and symmetrically to the axis.

5. The device (1) according to claim 1, characterized in that
a collection chamber (25) is arranged between said at least two connecting lines (40) and said measurement chamber (15) and connects said at least two connecting lines (40) to one another.

6. The device (1) according to claim 5, characterized in that
the collection chamber (25), which is formed by a collection channel (26) extending around the axis (X), has annular shape.

7. The device (1) according to claim 5, characterized in that
the collection chamber (25) is enclosed by the connection adapters (45) and the measuring unit (10).

8. The device (1) according to claim 5, characterized in that
said measurement chamber (15) is connected to said collection chamber (25) via an inlet (16) and an outlet (17).

9. The device (1) according to claim 1, characterized in that
said measuring unit (10) can be rotated about the axis (X) relative to said connection adapter (45).

10. The device (1) according to claim 1, characterized in that
said measuring instrument (20) is float-based.

11. The device (1) according to claim 1, characterized in that
the measurement chamber (15) has a viewing window (19).

12. The device (1) according to claim 1, characterized in that
said attachment adapter (35) can be fastened to said container (5) by means of a screw connection.

13. A container (5) for a medium at a high temperature with a device (1) according to claim 1.

14. A refrigerating machine (2) or refrigeration cycle (3), having a device (1) according to claim 1.

15. A device (1) for measuring a liquid level of a medium at a high temperature in a container (5), having
a measuring unit (10) with a measurement chamber (15) and a measuring instrument (20) for determining the liquid level in the measurement chamber (15), and
a connecting feature (30) for connecting said measuring unit (10) to said container (5) at a distance and for transferring the medium from said container (5) into said measurement chamber (15),
wherein said connecting feature (30) has an attachment adapter (35) for fastening to said container (5) and a common connection adapter (45) for connecting to said measuring unit (10) via a plurality of connecting lines (40) with the common connection adapter (45),
wherein said attachment adapter (35) and said connection adapter (45) are arranged at a distance along an axis (X) by at least two of said connecting lines (40),
and wherein said connection adapter (45) permits orienting said measurement chamber (15) in a vertical orientation and makes it possible to rotate the measuring unit (10) about an axis for vertical alignment.

16. The device (1) according to claim 15, characterized in that
the at least two connecting lines (40) extending between the connection adapter (45) and said measuring unit (10) so as to cool said at least two connecting lines (40) by convection.

17. The device (1) according to claim 15, characterized in that
said at least two connecting lines (40) are arranged parallel and symmetrically to the axis.

* * * * *